US012738417B2

(12) United States Patent
Na et al.

(10) Patent No.: US 12,738,417 B2
(45) Date of Patent: Sep. 15, 2026

(54) MULTILAYERED CAPACITOR

(71) Applicant: SAMSUNG ELECTRO-MECHANICS CO., LTD., Suwon-si (KR)

(72) Inventors: Hyunwoong Na, Suwon-si (KR); Youngjoon Oh, Suwon-si (KR); Seongmin Park, Suwon-si (KR); Youngkyu Park, Suwon-si (KR); Kyoungki Min, Suwon-si (KR); Seula Park, Suwon-si (KR)

(73) Assignee: SAMSUNG ELECTRO-MECHANICS CO., LTD., Suwon si (KR)

(*) Notice: Subject to any disclaimer, the term of this patent is extended or adjusted under 35 U.S.C. 154(b) by 141 days.

(21) Appl. No.: 18/910,821

(22) Filed: Oct. 9, 2024

(65) Prior Publication Data

US 2025/0218663 A1 Jul. 3, 2025

(30) Foreign Application Priority Data

Dec. 28, 2023 (KR) ........................ 10-2023-0194974

(51) Int. Cl.

| | |
|---|---|
| ***H01G 4/30*** | (2006.01) |
| ***H01G 4/008*** | (2006.01) |
| ***H01G 4/012*** | (2006.01) |
| ***H01G 4/12*** | (2006.01) |

(52) U.S. Cl.

CPC ......... *H01G 4/0085* (2013.01); *H01G 4/1227* (2013.01); *H01G 4/30* (2013.01)

(58) Field of Classification Search

CPC ........ H01G 4/30; H01G 4/0085; H01G 4/012; H01G 4/1227

See application file for complete search history.

(56) References Cited

U.S. PATENT DOCUMENTS

| | | | | |
|---|---|---|---|---|
| 2007/0148422 A1* | 6/2007 | Schulze | ................. | H10D 30/66 428/209 |
| 2014/0290863 A1* | 10/2014 | Watanabe | ............... | H10P 72/72 156/345.52 |
| 2018/0286586 A1* | 10/2018 | Jung | ..................... | C04B 35/495 |
| 2021/0313097 A1* | 10/2021 | Tsang | ..................... | H02H 9/026 |

(Continued)

FOREIGN PATENT DOCUMENTS

| | | |
|---|---|---|
| JP | 2023-068850 A | 5/2023 |
| KR | 10-2021-0054332 A | 5/2021 |
| KR | 10-2021-0143103 A | 11/2021 |

OTHER PUBLICATIONS

D. Sauceda et al., "High-throughput reaction engineering to assess the oxidation stability of MAX phases," npj Computational Materials, (2021) 7:6.

(Continued)

*Primary Examiner* — Michael P Mcfadden

(74) *Attorney, Agent, or Firm* — Morgan, Lewis & Bockius LLP

(57) ABSTRACT

The multilayered capacitor according to the present disclosure includes a capacitor body including a dielectric layer; an internal electrode; and a metal oxide layer disposed between the dielectric layer and the internal electrode, and an external electrode disposed outside the capacitor body, wherein the internal electrode includes a compound represented by Chemical Formula 1.

18 Claims, 9 Drawing Sheets

(56) References Cited

U.S. PATENT DOCUMENTS

| | | | | |
|---|---|---|---|---|
| 2021/0366653 | A1 | 11/2021 | Oh et al. | |
| 2022/0028792 | A1* | 1/2022 | Kang | H10P 14/412 |
| 2023/0137809 | A1 | 5/2023 | Suemasa | |
| 2023/0192514 | A1* | 6/2023 | Wei | C23C 16/271<br>205/758 |

OTHER PUBLICATIONS

X. H. Wang et al., "Stability and Selective Oxidation of Aluminum in Nano-Laminate Ti3AlC2 upon Heating in Argon," Chem. Mater., 2003, vol. 15, pp. 3716-3720.

* cited by examiner

FIG. 7

MULTILAYERED CAPACITOR

CROSS-REFERENCE TO RELATED APPLICATION

This application claims priority to and the benefit of Korean Patent Application No. 10-2023-0194974 filed in the Korean Intellectual Property Office on Dec. 28, 2023, the entire contents of which are incorporated herein by reference.

BACKGROUND OF THE INVENTION

(a) Field of the Invention

The present disclosure relates to a multilayered capacitor.

(b) Description of the Related Art

Recently, as multi-functionalization and miniaturization of electronic devices have been rapidly progressing, miniaturization and performance improvement of electronic components have also been progressing at a rapid pace. Further, the demand for high reliability of electric devices for use in automobiles, network equipment, or the like and electronic components for use in industries has also been increasing significantly.

In order to meet such market demands, competition for technology development of passive components such as inductors, capacitors, or resistors has been accelerating. In particular, great effort has been required to dominate the market by developing various multilayer ceramic capacitor (MLCC) products whose applications and usage as passive components have been continuously increasing.

In addition, a multilayered capacitor is manufactured by stacking dielectric layers and internal electrodes, and is used in various electronic devices such as mobile phones, laptops, and LCD TVs.

With recent technological advancements, multilayered capacitors are required to be miniaturized and have high capacities. To this end, technologies have been developed to increase an effective electrode area by increasing the connectivity of the internal electrodes in contact with the dielectric layer, or to atomize the dielectric material and internal electrode material.

Currently, in order to reduce a heat shrinkage temperature difference between the dielectric layer and the internal electrodes, the internal electrodes are manufactured by adopting a method of adding a nano-sized barium titanite ($BaTiO_3$) co-material.

However, if a content of the barium titanite co-material is increased, because layer density of the internal electrodes is decreased, the co-material diffused into the dielectric layer during the sintering may increase a thickness of the dielectric layer, causing a side effect of reducing capacity of the capacitor.

SUMMARY OF THE INVENTION

One aspect of the embodiment provides a multilayered capacitor with excellent electrode connectivity and excellent electrical characteristics.

However, the problems that the embodiments seek to solve are not limited to the aforementioned problems and can be expanded in various ways within the scope of the technical ideas included in the embodiments.

A multilayered capacitor according to an embodiment includes a capacitor body including a dielectric layer; an internal electrode; and a metal oxide layer disposed between the dielectric layer and the internal electrode, and an external electrode disposed outside the capacitor body, and the internal electrode includes a compound represented by Chemical Formula 1.

$$M_{n+1}AX_n \quad \text{[Chemical Formula 1]}$$

In Chemical Formula 1,

M includes at least one selected from the group consisting of Ti, Zr, Hf, Sc, Cr, V, Nb, Ta, Mo, Mn, and combinations thereof, A includes at least one selected from the group consisting of Al, Ga, In, Tl, Si, Ge, Sn, Pb, Zn, Cd, P, As, S, Cu, Au, and combinations thereof, X includes C, N, or a combination thereof, and n is an integer of 1 to 4.

The compound represented by Chemical Formula 1 may include at least one selected from the group consisting of $Ti_2AlC$, $V_2AlC$, $Cr_2AlC$, $Nb_2AlC$, $Ta_2AlC$, $Zr_2AlC$, $Ti_2AlN$, $Ti_3AlC_2$, $V_3AlC_2$, $Ta_3AlC_2$, $Zr_3AlC_2$, $Ti_4AlN_3$, $V_4AlC_3$, $Nb_4AlC_3$, $Ta_4AlC_3$, $(Mo, V)_4AlC_3$, $Mo_4VAlC_4$, $Ti_3SiC_2$, $Ti_4SiC_3$, $Ti_2CdC$, $Sc_2InC$, $Sc_2SnC$, $Ti_2GaC$, $Ti_2InC$, $Ti_2TlC$, $V_2GaC$, $Cr_2GaC$, $Ti_2GaN$, $Ti_2InN$, $V_2GaN$, $Cr_2GaN$, $Ti_2GeC$, $Ti_2SnC$, $Ti_2PbC$, $V_2GeC$, $Cr_2GeC$, $V_2PC$, $V_2AsC$, $Ti_2SC$, $Zr_2InC$, $Zr_2TlC$, $Nb_2GaC$, $Nb_2InC$, $Mo_2GaC$, $Zr_2InN$, $Zr_2TlN$, $Zr_2SnC$, $Zr_2PbC$, $Nb_2SnC$, $Nb_2PC$, $Nb_2AsC$, $Zr_2SC$, $Nb_2SC$, $Hf_2InC$, $Hf_2TlC$, $Ta_2GaC$, $Hf_2SnC$, $Hf_2PbC$, $Hf_2SnN$, $Hf_2SC$, $Ti_2ZnC$, $Ti_2ZnN$, $V_2ZnC$, $Nb_2CuC$, $Mn_2GaC$, $Mo_2AuC$, $Ti_2AuN$, $Ti_3GaC_2$, $Ti_3InC_2$, $Ti_3GeC_2$, $Ti_2SnC_2$, $Ti_3ZnC_2$, $Ti_4GaC_3$, $Ti_4GeC_3$, and combinations thereof.

The compound represented by Chemical Formula 1 may include a compound represented by Chemical Formula 1A.

$$M_{n+1}AX_n \quad \text{[Chemical Formula 1A]}$$

In Chemical Formula 1A,

M includes at least one selected from the group consisting of Ti, Zr, Cr, V, Nb, Ta, Mo, Hf, Sc, Mn, and combinations thereof, $A^1$ includes Al or Si, X includes C, N, or a combination thereof, and n is an integer of 1 to 4.

The compound represented by Chemical Formula 1A may include at least one selected from the group consisting of $Ti_2AlC$, $V_2AlC$, $Cr_2AlC$, $Nb_2AlC$, $Ta_2AlC$, $Zr_2AlC$, $Ti_2AlN$, $Ti_3AlC_2$, $V_3AlC_2$, $Ta_3AlC_2$, $Zr_3AlC_2$, $Ti_4AlN_3$, $V_4AlC_3$, $Nb_4AlC_3$, $Ta_4AlC_3$, $(Mo, V)_4AlC_3$, $Mo_4VAlC_4$, $Ti_3SiC_2$, $Ti_4SiC_3$, and combinations thereof.

The compound represented by Chemical Formula 1 may include a compound represented by Chemical Formula 1B.

$$M_{n+1}AlC_n \quad \text{[Chemical Formula 1B]}$$

In Chemical Formula 1B,

M includes at least one selected from the group consisting of Ti, Zr, Cr, V, Nb, Ta, Mo, Hf, Sc, Mn, and combinations thereof, and n is an integer of 1 to 4.

The compound represented by Chemical Formula 1B may include at least one selected from the group consisting of $Ti_2AlC$, $V_2AlC$, $Cr_2AlC$, $Nb_2AlC$, $Ta_2AlC$, $Zr_2AlC$, and combinations thereof.

The internal electrode may further include a conductive metal, and the conductive metal may include at least one selected from the group consisting of Ni, Mg, Al, Zr, Bi, Ru, Ir, Cu, Co, Zn, Ag, Pd, Au, Co, Mn, Cr, Pt, Sn, W, Ti, Pb, alloys thereof, and combinations thereof.

The metal oxide layer may include at least one selected from the group consisting of Ni oxide, Mg oxide, Al oxide, Zr oxide, Bi oxide, Ru oxide, Ir oxide, Cu oxide, Co oxide, Zn oxide, Ag oxide, Pd oxide, Au oxide, Co oxide, Mn oxide, Cr oxide, Pt oxide, Sn oxide, W oxide, Ti oxide, Pb oxide, and combinations thereof.

The dielectric layer contains a barium titanate-based compound as a main component, and the barium titanite-based compound may include at least one selected from the group consisting of $Ba_mTiO_3$ ($0.995 \le m \le 1.010$), $(Ba_{1-X}Ca_x)_m(Ti_{1-y}Zr_y)O_3$ ($0.995 \le m \le 1.010$, $0 \le x \le 0.10$, $0 < y \le 0.20$), $Ba_m(Ti_{1-x}Zr_x)O_3$ ($0.995 \le m \le 1.010$, $x \le 0.10$), $(Ba_{1-X}Ca_x)_m(Ti_{1-y}Sn_y)O_3$ ($0.995 \le m \le 1.010$, $0 \le x \le 0.10$, $0 < y \le 0.20$), and combinations thereof.

A multilayered capacitor according to another embodiment includes a capacitor body including a dielectric layer; an internal electrode including a conductive metal; and a metal oxide layer between the dielectric layer and the internal electrode, and an external electrode disposed an outside surface of the capacitor body, wherein the internal electrode includes a compound represented by Chemical Formula 1.

$$M_{n+1}AX_n \quad \text{[Chemical Formula 1]}$$

In Chemical Formula 1,

M includes at least one selected from the group consisting of Ti, Zr, Hf, Sc, Cr, V, Nb, Ta, Mo, Mn, and combinations thereof, A includes at least one selected from the group consisting of Al, Ga, In, Tl, Si, Ge, Sn, Pb, Zn, Cd, P, As, S, Cu, Au, and combinations thereof, X includes C, N, or a combination thereof, and n is an integer of 1 to 4.

The compound represented by Chemical Formula 1 may include at least one selected from the group consisting of $Ti_2AlC$, $V_2AlC$, $Cr_2AlC$, $Nb_2AlC$, $Ta_2AlC$, $Zr_2AlC$, $Ti_2AlN$, $Ti_3AlC_2$, $V_3AlC_2$, $Ta_3AlC_2$, $Zr_3AlC_2$, $Ti_4AlN_3$, $V_4AlC_3$, $Nb_4AlC_3$, $Ta_4AlC_3$, $(Mo, V)_4AlC_3$, $Mo_4VAlC_4$, $Ti_3SiC_2$, $Ti_4SiC_3$, $Ti_2CdC$, $Sc_2InC$, $Sc_2SnC$, $Ti_2GaC$, $Ti_2InC$, $Ti_2TlC$, $V_2GaC$, $Cr_2GaC$, $Ti_2GaN$, $Ti_2InN$, $V_2GaN$, $Cr_2GaN$, $Ti_2GeC$, $Ti_2SnC$, $Ti_2PbC$, $V_2GeC$, $Cr_2GeC$, $V_2PC$, $V_2AsC$, $Ti_2SC$, ZraInC, $Zr_2TlC$, $Nb_2GaC$, $Nb_2InC$, $Mo_2GaC$, $Zr_2InN$, $Zr_2TlN$, $Zr_2SnC$, $Zr_2PbC$, $Nb_2SnC$, $Nb_2PC$, $Nb_2AsC$, $Zr_2SC$, $Nb_2SC$, $Hf_2InC$, $Hf_2TlC$, $Ta_2GaC$, $Hf_2SnC$, $Hf_2PbC$, $Hf_2SnN$, $Hf_2SC$, $Ti_2ZnC$, $Ti_2ZnN$, $V_2ZnC$, $Nb_2CuC$, $Mn_2GaC$, $Mo_2AuC$, $Ti_2AuN$, $Ti_3GaC_2$, $Ti_3InC_2$, $Ti_3GeC_2$, $Ti_2SnC_2$, $Ti_3ZnC_2$, $Ti_4GaC_3$, $Ti_4GeC_3$, and combinations thereof.

The compound represented by Chemical Formula 1 may include a compound represented by Chemical Formula 1A.

$$M_{n+1}A^{1}X_n \quad \text{[Chemical Formula 1A]}$$

In Chemical Formula 1A,

M includes at least one selected from the group consisting of Ti, Zr, Cr, V, Nb, Ta, Mo, Hf, Sc, Mn, and combinations thereof, $A^1$ includes Al or Si, X includes C, N, or a combination thereof, and n is an integer of 1 to 4.

The compound represented by Chemical Formula 1A may include at least one selected from the group consisting of $Ti_2AlC$, $V_2AlC$, $Cr_2AlC$, $Nb_2AlC$, $Ta_2AlC$, $Zr_2AlC$, $Ti_2AlN$, $Ti_3AlC_2$, $V_3AlC_2$, $Ta_3AlC_2$, $Zr_3AlC_2$, $Ti_4AlN_3$, $V_4AlC_3$, $Nb_4AlC_3$, $Ta_4AlC_3$, $(Mo, V)_4AlC_3$, $Mo_4VAlC_4$, $Ti_3SiC_2$, $Ti_4SiC_3$, and combinations thereof.

The compound represented by Chemical Formula 1 may include a compound represented by Chemical Formula 1B.

$$M_{n+1}AlC_n \quad \text{[Chemical Formula 1B]}$$

In Chemical Formula 1B,

M includes at least one selected from the group consisting of Ti, Zr, Cr, V, Nb, Ta, Mo, Hf, Sc, Mn, and combinations thereof, and n is an integer of 1 to 4.

The compound represented by Chemical Formula 1B may include at least one selected from the group consisting of $Ti_2AlC$, $V_2AlC$, $Cr_2AlC$, $Nb_2AlC$, $Ta_2AlC$, $Zr_2AlC$, and combinations thereof.

The conductive metal included in the internal electrode may include at least one selected from the group consisting of Ni, Mg, Al, Zr, Bi, Ru, Ir, Cu, Co, Zn, Ag, Pd, Au, Co, Mn, Cr, Pt, Sn, W, Ti, Pb, alloys thereof, and combinations thereof.

The metal oxide layer may include at least one selected from the group consisting of Ni oxide, Mg oxide, Al oxide, Zr oxide, Bi oxide, Ru oxide, Ir oxide, Cu oxide, Co oxide, Zn oxide, Ag oxide, Pd oxide, Au oxide, Co oxide, Mn oxide, Cr oxide, Pt oxide, Sn oxide, W oxide, Ti oxide, Pb oxide, and combinations thereof.

The dielectric layer may include a barium titanate-based compound as a main component, and the barium titanite-based compound may include at least one selected from the group consisting of $Ba_mTiO_3$ ($0.995 \le m \le 1.010$), $(Ba_{1-X}Ca_x)_m(Ti_{1-y}Zr_y)O_3$ ($0.995 \le m \le 1.010$, $0 \le x \le 0.10$, $0 < y \le 0.20$), $Ba_m(Ti_{1-x}Zr_x)O_3$ ($0.995 \le m \le 1.010$, $x \le 0.10$), $(Ba_{1-X}Ca_x)_m(Ti_{1-y}Sn_y)O_3$ ($0.995 \le m \le 1.010$, $0 \le x \le 0.10$, $0 < y \le 0.20$), and combinations thereof.

The multilayered capacitor according to some embodiments of the present disclosure may have the advantage of excellent electrode connectivity and excellent electrical characteristics.

However, the various and beneficial advantages and effects of the present invention are not limited to the aforementioned descriptions, and may be more easily understood in the process of explaining specific embodiments of the present invention.

BRIEF DESCRIPTION OF THE DRAWINGS

FIG. 7 is (a) a scanning electron microscope (SEM) image of a portion of the cross-section of the multilayered capacitor according to Example 1, (b) an SEM-EDS analysis image by Ni-mapping for (a) the SEM image, and (c) an SEM-EDS analysis image by Ti-mapping for (a) the SEM image.

DETAILED DESCRIPTION OF THE EMBODIMENTS

Figure 1:
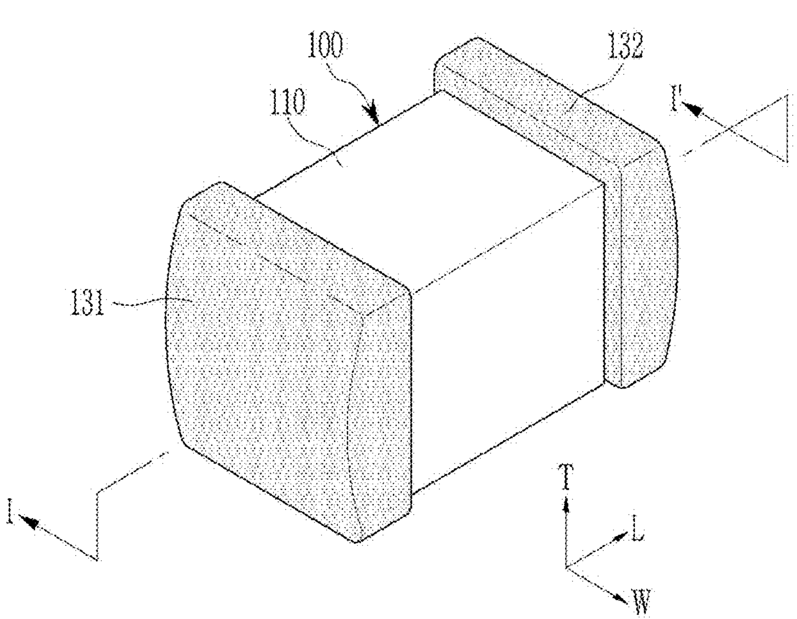
FIG. 1 is a perspective view showing a multilayered capacitor according to an embodiment.

Hereinafter, example embodiments of the present invention will be described in detail with reference to the accompanying drawings such that those skilled in the art can easily implement them. The drawings and description are to be regarded as illustrative in nature and not restrictive. Like reference numerals designate like elements throughout the specification. Further, the accompanying drawings are provided for helping to easily understand example embodiments disclosed in the present specification, and the technical spirit disclosed in the present specification is not limited by the accompanying drawings, and it will be appreciated that the present invention includes all of the modifications, equivalent matters, and substitutes included in the spirit and the technical scope of the present invention.

Terms including an ordinary number, such as first and second, are used for describing various constituent elements, but the constituent elements are not limited by the terms. The terms are used only to discriminate one constituent element from another constituent element.

When a constituent element is referred to as being “connected” or “coupled” to another constituent element, it will be appreciated that it may be directly connected or coupled to the other constituent element, or face the other constituent element, or intervening other constituent elements may be present. In contrast, when a constituent element is referred to as being “directly connected” or “directly coupled” to another constituent element, it will be appreciated that there are no intervening other constituent elements present.

In the present specification, it will be appreciated that terms “including” and “having” are intended to designate the existence of characteristics, numbers, steps, operations, constituent elements, and components described in the specification or a combination thereof, and do not exclude a possibility of the existence or addition of one or more other characteristics, numbers, steps, operations, constituent elements, and components, or a combination thereof in advance. Accordingly, unless explicitly described to the contrary, the word “comprise,” and variations such as “comprises” or “comprising,” will be understood to imply the inclusion of stated elements but not the exclusion of any other elements.

As used herein, the term “a main component” means occupying 50% by mass or more, 50 mol % or more of the constituent components.

Figure 2:
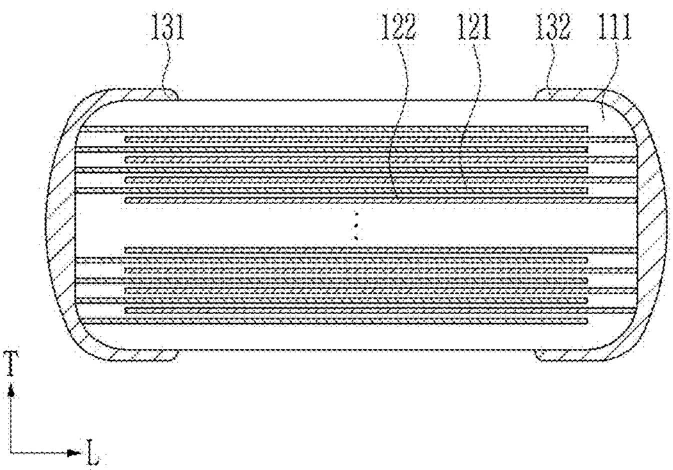
FIG. 2 is a cross-sectional view of the multilayered capacitor taken along line I-I' of FIG. 1.
Figure 3:
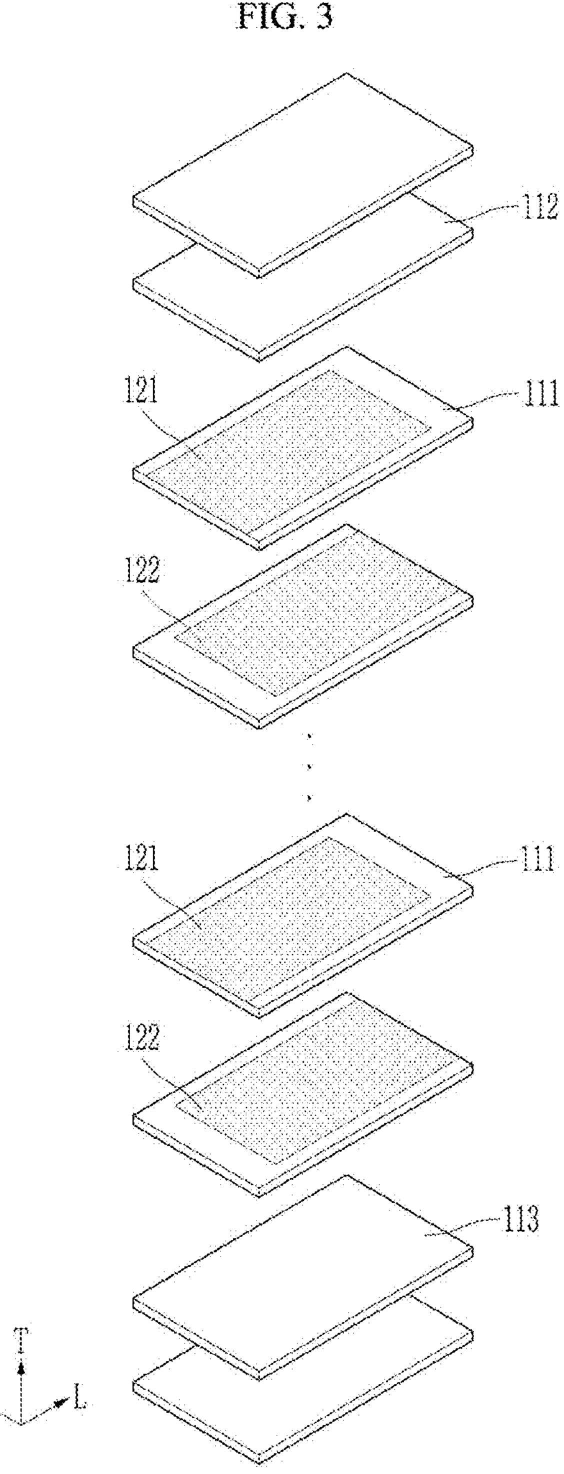
FIG. 3 is an exploded perspective view showing a stacked structure of internal electrodes in the capacitor body of FIG. 1.

FIG. 1 is a perspective view showing a multilayered capacitor 100 according to an embodiment, FIG. 2 is a cross-sectional view of the multilayered capacitor 100 taken along line I-I' of FIG. 1, and FIG. 3 is an exploded perspective view showing the stacked structure of internal electrodes in the capacitor body 110 of FIG. 1.

To clearly describe the present example embodiment, directions are defined as follow: the L axis, the W axis, and the T axis shown in the drawings represent the longitudinal direction, width direction, and thickness direction of the capacitor body 110, respectively. Herein, the thickness direction (T-axis direction) may be a direction perpendicular to wide surfaces (main surfaces) of sheet-shaped constituent elements, and may be used, for example, as the same concept as the stacking direction in which dielectric layers 111 are stacked. The longitudinal direction (L-axis direction) may be a direction extending in parallel with the wide surfaces (main surfaces) of the sheet-shaped constituent elements and be a direction appropriately perpendicular to the thickness direction (T-axis direction), and may be, for example, a direction in which a first external electrode 131 and a second external electrode 132 are positioned on both sides. The width direction (W-axis direction) may be a direction extending in parallel with the wide surfaces (main surfaces) of the sheet-shaped constituent elements and be a direction appropriately perpendicular to the thickness direction (T-axis direction) and the longitudinal direction (L-axis direction), and the lengths of the sheet-shaped constituent elements in the longitudinal direction (L-axis direction) may be longer than their lengths in the width direction (W-axis direction).

Referring to FIGS. 1 to 3, the multilayered capacitor 100 according to the example embodiment may include the capacitor body 110, and the first external electrode 131 and the second external electrode 132 that are disposed on both ends of the capacitor body 110 facing each other in the longitudinal direction (L-axis direction).

The capacitor body 110 may have, for example, an approximate hexahedral shape.

In the present embodiment, for ease of explanation, in the capacitor body 110, two surfaces facing each other in the thickness direction (T-axis direction) are defined as a first surface and a second surface, and two surfaces that are coupled to the first surface and the second surface and face each other in the longitudinal direction (L-axis direction) are defined as a third surface and a fourth surface, and two surfaces that are coupled to the first surface and the second surface, are coupled to the third surface and the fourth surface, and face each other in the width direction (W-axis direction) are defined as a fifth surface and a sixth surface.

As an example, the first surface which is the lower surface may be a surface oriented to the mounting direction. Further, the first surface to the sixth surface may be flat; however, the present example embodiment is not limited thereto, and for example, the first surface to the sixth surface may be curved surfaces with convex center portions, and the border of each surface, i.e., the edge may be rounded.

The shape and dimensions of the capacitor body 110 and the number of dielectric layers 111 that are stacked are not limited to those shown in the drawings of the present example embodiment.

The capacitor body 110 is formed by stacking a plurality of dielectric layers 111 in the thickness direction (T-axis direction) and sintering them, and includes the plurality of dielectric layers 111, and first internal electrodes 121 and second internal electrodes 122 that are alternately disposed in the thickness direction (T-axis direction) with the dielectric layers 111 interposed therebetween.

In this case, adjacent dielectric layers 111 in the capacitor body 110 may be so integrated that it is difficult to see the boundaries between the dielectric layers without the use of a scanning electron microscope (SEM).

Further, the capacitor body 110 may include an active region and cover regions 112 and 113.

The active region is a portion that contributes to the formation of the capacity of the multilayered capacitor 100. As an example, the active region may be the region where the first internal electrodes 121 and the second internal electrodes 122 that are stacked along the thickness direction (T-axis direction) overlap.

The cover regions 112 and 113 are margin portions in the thickness direction, and may be positioned on the first surface side and second surface side of the active region in the thickness direction (T-axis direction). These cover regions 112 and 113 may be stacked on the upper surface and lower surface of the active region, respectively, and each may consist of a single dielectric layer 111 or two or more dielectric layers 111.

Also, the capacitor body 110 may further include side cover regions. The side cover regions are margin portions in the width direction, and may be positioned on the fifth surface side and sixth surface side of the active region in the width direction (W-axis direction), respectively. These side cover regions may be formed by stacking dielectric green sheets with conductive paste layers for forming internal electrodes and sintering them. When the conductive paste layers are formed on the surfaces of the dielectric green sheets, the conductive paste may be coated only on some portions of the surfaces of the dielectric green sheets and may not be coated on both side surfaces of the surfaces of the dielectric green sheets.

The cover regions 112 and 113 and the side cover regions may serve to prevent damage to the first internal electrodes 121 and the second internal electrodes 122 by physical or chemical stress.

The multilayered capacitor 100 according to some embodiments of the present disclosure includes a capacitor body 110 including a dielectric layer 111; internal electrodes 121 and 122; and a metal oxide layer disposed between the dielectric layer 111 and the internal electrodes 121 and 122, and external electrodes 131 and 132 disposed outside the capacitor body 110.

Hereinafter, the multilayered capacitor 100 will be described in detail with reference to the drawings.

Internal Electrode

The first internal electrodes 121 and the second internal electrodes 122 are electrodes with different polarities, and may be alternately disposed along the T-axis direction such that a first internal electrode and a second internal electrode adjacent to each other with a dielectric layer 111 interposed therebetween face each other, and one end of each internal electrode may be exposed from the third and fourth surfaces of the capacitor body 110.

The first internal electrodes 121 and the second internal electrodes 122 may be electrically insulated from each other by the dielectric layers 111 disposed therebetween.

The end portions of the first internal electrodes 121 and the second internal electrodes 122 that are alternately exposed from the third and fourth surfaces of the capacitor body 110 may be electrically coupled to the first external electrode 131 and the second external electrode 132, respectively.

In some embodiments, the internal electrodes 121 and 122 include a compound represented by Chemical Formula 1.

$$M_{n+1}AX_n \quad \text{[Chemical Formula 1]}$$

In Chemical Formula 1,

M includes at least one selected from the group consisting of Ti, Zr, Hf, Sc, Cr, V, Nb, Ta, Mo, Mn, and combinations thereof, A includes at least one selected from the group consisting of Al, Ga, In, Tl, Si, Ge, Sn, Pb, Zn, Cd, P, As, S, Cu, Au, and combinations thereof, X includes C, N, or a combination thereof, and n is an integer of 1 to 4.

For example, the compound represented by Chemical Formula 1 may be a MAX phase compound. The Max phase compound may be a compound that has both metallic and ceramic properties, and may have excellent thermal and electrical conductivity, and may have high strength and modulus.

For example, the Max phase compound may have a higher sintering temperature than metals such as Ni, and thus there may not be a significant difference between the sintering temperature and the dielectric material of the dielectric layer 111. Accordingly, when the internal electrodes 121 and 122 including the Max phase compound and the dielectric layer 111 are sintered together, mismatching problems with the dielectric layer 111 do not occur, and thus electrode connectivity may be significantly improved by preventing disconnection or thickness expansion of the internal electrodes 121 and 122

For example, the compound represented by Chemical Formula 1 may include at least one selected from the group consisting of $Ti_2AlC$, $V_2AlC$, $Cr_2AlC$, $Nb_2AlC$, $Ta_2AlC$, $Zr_2AlC$, $Ti_2AlN$, $Ti_3AlC_2$, $V_3AlC_2$, $Ta_3AlC_2$, $Zr_3AlC_2$, $Ti_4AlN_3$, $V_4AlC_3$, $Nb_4AlC_3$, $Ta_4AlC_3$, $(Mo, V)_4AlC_3$, $Mo_4VAlC_4$, $Ti_3SiC_2$, $Ti_4SiC_3$, $Ti_2CdC$, $Sc_2InC$, $Sc_2SnC$, $Ti_2GaC$, $Ti_2InC$, $Ti_2TlC$, $V_2GaC$, $Cr_2GaC$, $Ti_2GaN$, $Ti_2InN$, $V_2GaN$, $Cr_2GaN$, $Ti_2GeC$, $Ti_2SnC$, $Ti_2PbC$, $V_2GeC$, $Cr_2GeC$, $V_2PC$, $V_2AsC$, $Ti_2SC$, ZraInC, $Zr_2TlC$, $Nb_2GaC$, $Nb_2InC$, $Mo_2GaC$, $Zr_2InN$, $Zr_2TlN$, $Zr_2SnC$, $Zr_2PbC$, $Nb_2SnC$, $Nb_2PC$, $Nb_2AsC$, $Zr_2SC$, $Nb_2SC$, $Hf_2InC$, $Hf_2TlC$, $Ta_2GaC$, $Hf_2SnC$, $Hf_2PbC$, $Hf_2SnN$, $Hf_2SC$, $Ti_2ZnC$, $Ti_2ZnN$, $V_2ZnC$, $Nb_2CuC$, $Mn_2GaC$, $Mo_2AuC$, $Ti_2AuN$, $Ti_3GaC_2$, $Ti_3InC_2$, $Ti_3GeC_2$, $Ti_3SnC_2$, $Ti_3ZnC_2$, $Ti_4GaC_3$, $Ti_4GeC_3$, and combinations thereof.

For example, the compound represented by Chemical Formula 1 may include a compound represented by Chemical Formula 1A.

$$M_{n+1}A^1X_n \quad \text{[Chemical Formula 1A]}$$

In Chemical Formula 1A,

M includes at least one selected from the group consisting of Ti, Zr, Cr, V, Nb, Ta, Mo, Hf, Sc, Mn, and combinations thereof, $A^1$ includes Al or Si, X includes C, N, or a combination thereof, and n is an integer of 1 to 4.

For example, the compound represented by Chemical Formula 1A may include at least one selected from the group consisting of $Ti_2AlC$, $V_2AlC$, $Cr_2AlC$, $Nb_2AlC$, $Ta_2AlC$, $Zr_2AlC$, $Ti_2AlN$, $Ti_3AlC_2$, $V_3AlC_2$, $Ta_3AlC_2$, $Zr_3AlC_2$, $Ti_4AlN_3$, $V_4AlC_3$, $Nb_4AlC_3$, $Ta_4AlC_3$, $(Mo, V)_4AlC_3$, $Mo_4VAlC_4$, $Ti_3SiC_2$, $Ti_4SiC_3$, and combinations thereof.

For example, the compound represented by Chemical Formula 1 may include a compound represented by Chemical Formula 1B.

$$M_{n+1}AlC_n \quad \text{[Chemical Formula 1B]}$$

In Chemical Formula 1B,

M includes at least one selected from the group consisting of Ti, Zr, Cr, V, Nb, Ta, Mo, Hf, Sc, Mn, and combinations thereof, and n is an integer of 1 to 4.

For example, the compound represented by Chemical Formula 1B may include at least one selected from the group consisting of $Ti_2AlC$, $V_2AlC$, $Cr_2AlC$, $Nb_2AlC$, $Ta_2AlC$, $Zr_2AlC$, and combinations thereof.

For example, the internal electrodes 121 and 122 may further include a conductive metal, wherein the conductive metal may be the same as or different from a sacrificial metal to be described later. For example, the conductive metal may be same materials as the sacrificial metal contained in the conductive paste for an internal electrode, which is not oxidized but trapped in the internal electrodes 121 and 122 during the sintering.

For example, the conductive metal included in the internal electrodes 121 and 122 may include at least one selected from the group consisting of Ni, Mg, Al, Zr, Bi, Ru, Ir, Cu, Co, Zn, Ag, Pd, Au, Co, Mn, Cr, Pt, Sn, W, Ti, Pb, an alloy thereof, and combinations thereof.

In addition, the internal electrodes 121 and 122 may include dielectric particles with the same composition as a ceramic material included in the dielectric layer 111.

As an example, the internal electrodes 121 and 122 may be formed using a conductive paste including a conductive metal. The printing method of the conductive paste may use a screen printing method, a gravure printing method, or the like.

As an example, average thicknesses of the first internal electrodes 121 and the second internal electrodes 122 may be greater than or equal to about 0.05 μm, greater than or equal to about 0.1 μm, greater than or equal to about 0.2 μm, or greater than or equal to about 0.25 μm, and less than or equal to about 2 μm, less than or equal to about 1 μm, or less than or equal to about 0.5 μm.

The average thickness of the first internal electrode 121 or second internal electrode 122 can be measured by the following method.

First, the multilayered capacitor 100 is placed in an epoxy mixture and cured, and the L-axis and T-axis direction sides of the capacitor body 110 are polished to ½ the point in a W-axis direction, then placed in a vacuum atmosphere chamber, and then, cut in the L-axis direction and the T-axis direction from the center of the W-axis direction of the capacitor body 110 to prepare a cross-sectional sample (hereinafter referred to as "cross-sectional sample").

It may be an arithmetic mean value of the thicknesses of the first internal electrode 121 or second internal electrode 122 at 10 points spaced at predetermined intervals from a reference point in the scanning electron microscope (SEM) of the cross-sectional sample, when the center point in the longitudinal direction (L-axis direction) or width direction (W-axis direction) of the first internal electrode 121 or second internal electrode 122 is used as a reference point.

The intervals between the 10 points may be adjusted according to the scale of the SEM image, and may be, for example, an interval of about 1 μm to about 100 μm, about 1 μm to about 50 μm, or about 1 μm to about 10 μm.

In this case, all 10 points should be located within the first internal electrode 121 or the second internal electrode layer 122, and when all 10 points are not located within the first internal electrode 121 or the second internal electrode layer 122, the position of the reference point may be changed or the interval of 10 points may be adjusted.

Metal Oxide Layer

The multilayered capacitor 100 according to some embodiments of the present disclosure may include a metal oxide layer (not illustrated) between the dielectric layer 111 and the internal electrodes 121 and 122. The metal oxide layer may be a reaction blocking layer that suppresses oxidation of the Max phase compound included in the internal electrodes 121 and 122.

If the conductive paste for the internal electrodes includes the Max phase compound alone and is sintered, the elements constituting the Max phase may be oxidized and the Max phase compound may be decomposed. In addition, if the compound represented by Chemical Formula 1 is fired under an oxygen atmosphere, as the relatively weakly bound A element is oxidized and thus forms an A-oxide, the compound represented by Chemical Formula 1 may be decomposed. As the A element is oxidized and escapes from the compound represented by Chemical Formula 1, the Max phase compound may be decomposed into a binary compound, etc. Herein, the Max phase compound may be removed, deteriorating electrical characteristics of the internal electrodes 121 and 122.

On the other hand, in the multilayered capacitor 100 according to some embodiments of the present disclosure, during forming the internal electrodes, the metal oxide layer may be formed by adding a metal with excellent metal reactivity (hereinafter, referred to as a 'sacrificial metal') added to the Max phase compound and firing them together, so that the metal may be earlier oxidized than the Max phase compound during the firing.

For example, the Max phase compound may be decomposed at about 900° C. to about 1000° C., and the sacrificial metal, which has an oxidation reaction at about 900° C. or less, may be earlier oxidized than the Max phase compound. For example, Ti may be oxidized at about 600° C., Mg may be oxidized at about 450° C., and Cr may be oxidized at about 650° C.

The formed metal oxide layer may prevent decomposition of the Max phase compound and thus improve electrical characteristics of the multilayered capacitor 100.

For example, the metal oxide layer may include a metal oxide, wherein the metal oxide may be appropriately selected depending on types of A included in Chemical Formula 1. The metal oxide may be an oxide formed by oxidation of the sacrificial metal included in the conductive paste for an internal electrode.

For example, the metal oxide may include at least one selected from the group consisting of Ni oxide, Mg oxide, Al oxide, Zr oxide, Bi oxide, Ru oxide, Ir oxide, Cu oxide, Co oxide, Zn oxide, Ag oxide, Pd oxide, Au oxide, Co oxide, Mn oxide, Cr oxide, Pt oxide, Sn oxide, W oxide, Ti oxide, Pb oxide, and combinations thereof.

Dielectric Layer

The dielectric layer 111 includes a dielectric material, and the dielectric material may include a main component and a subcomponent.

The main component is a dielectric base material, may have a high dielectric constant, and may contribute to forming the dielectric constant of the multilayered capacitor 100.

For example, the main component may include a barium titanate-based compound, and the barium titanate-based compound may be a dielectric material including at least one selected from the group consisting of $Ba_mTiO_3$ ($0.995 \leq m \leq 1.010$), $(Ba_{1-x}Ca_x)_m(Ti_{1-y}Zr_y)O_3$ ($0.995 \leq m \leq 1.010$, $0 \leq x \leq 0.10$, $0 < y \leq 0.20$), $Ba_m(Ti_{1-x}Zr_x)O_3$ ($0.995 \leq m \leq 1.010$, $x \leq 0.10$), $(Ba_{1-x}Ca_x)_m(Ti_{1-y}Sn_y)O_3$ ($0.995 \leq m \leq 1.010$, $0 \leq x \leq 0.10$, $0 < y \leq 0.20$), and combinations thereof.

For example, the main component may include at least one selected from the group consisting of $BaTiO_3$, $Ba(Ti, Zr)O_3$, $Ba(Ti, Sn)O_3$, $(Ba, Ca) TiO_3$, $(Ba, Ca) (Ti, Zr)O_3$, (Ba, Ca) (Ti, Sn)$O_3$, (Ba, Sr) $TiO_3$, (Ba, Sr) (Ti, Zr)$O_3$, (Ba, Sr) (Ti, Sn)$O_3$, and combinations thereof.

For example, the subcomponent may include at least one selected from the group consisting of dysprosium (Dy), vanadium (V), manganese (Mn), chromium (Cr), silicon (Si), aluminum (Al), magnesium (Mg), tin (Sn), antimony (Sb), germanium (Ge), gallium (Ga), barium (Ba), lanthanum (La), yttrium (Y), actinium (Ac), cerium (Ce), praseodymium (Pr), neodymium (Nd), promethium (Pm), samarium (Sm), europium (Eu), gadolinium (Gd), terbium (Tb), holmium (Ho), erbium (Er), thulium (Tm), ytterbium (Yb), lutetium (Lu), hafnium. (Hf), indium (In), and combinations thereof.

The dielectric may further include a ceramic additive, an organic solvent, a binder, a dispersant, or combinations thereof.

For example, the average thickness of the dielectric layer 111 may be greater than or equal to about 0.2 μm, greater than or equal to about 0.5 μm, greater than or equal to about 1.0 μm, or greater than or equal to about 2.0 μm, and may be less than or equal to about 5.0 μm, or less than or equal to about 3.0 μm.

The average thickness of the dielectric layer 111 may be measured by the following method.

First, a scanning electron microscope (SEM) image obtained by observing a cross-sectional sample with a scanning electron microscope is prepared.

It may be an arithmetic mean value of the thicknesses of the dielectric layer 111 at 10 points spaced at predetermined intervals from a reference point in the SEM image of the cross-sectional sample, when the center point in the longitudinal direction (L-axis direction) or width direction (W-axis direction) of dielectric layer 111 is used as a reference point.

The intervals between the 10 points may be adjusted according to the scale of the SEM image, and may be, for example, an interval of about 1 μm to about 100 μm, about 1 μm to about 50 μm, or about 1 μm to about 10 μm.

In this case, all 10 points should be located within the first internal electrode 121 or the second internal electrode layer 122, and when all 10 points are not located within the first internal electrode 121 or the second internal electrode layer 122, the position of the reference point may be changed or the interval of 10 points may be adjusted.

External Electrode

The first external electrode 131 and the second external electrode 132 may receive voltages of different polarities, and may be electrically connected to the exposed portions of the first internal electrodes 121 and the second internal electrodes 122, respectively.

According to the above configuration, when a predetermined voltage is applied between the first external electrode 131 and the second external electrode 132, charge is accumulated between the first internal electrodes 121 and the second internal electrodes 122 facing each other. At this time, the capacitance of the multilayered capacitor 100 becomes proportional to the overlapped area of the first internal electrodes 121 and the second internal electrodes 122 overlapping each other along the T-axis direction in the active region.

The first external electrode 131 and the second external electrode 132 may be disposed on the third and fourth surfaces of the capacitor body 110, respectively, and may include first and second connection portions, respectively, that are in contact with the first internal electrodes 121 and the second internal electrodes 122, respectively, and include first and second band portions, respectively, that are disposed at the edges where the third and fourth surfaces of the capacitor body 110 meet either the first and second surfaces or the fifth and sixth surfaces.

The first and second band portions may extend from the first and second connection portions to some points of either the first and second surfaces or fifth and sixth surfaces of the capacitor body 110. The first and second band portions may serve to improve the adhesion strength of the first external electrode 131 and the second external electrode 132.

According to some embodiments, each of the first external electrode 131 and the second external electrode 132 may include a sintered metal layer that is in contact with the capacitor body 110, a conductive resin layer that is disposed to cover the sintered metal layer, and a plating layer that is disposed to cover the conductive resin layer.

The sintered metal layer may include a conductive metal and glass.

According to some embodiments, the sintered metal layer may include, as the conductive metal, at least one selected from the group consisting of copper (Cu), nickel (Ni), silver (Ag), palladium (Pd), gold (Au), platinum (Pt), tin (Sn), tungsten (W), titanium (Ti), lead (Pb), alloys thereof, and combinations thereof, and for example, copper (Cu) may include a copper (Cu) alloy. When the conductive metal includes copper, metals other than copper may be included in an amount of less than or equal to about 5 parts by mole based on 100 parts by mole of copper.

According to some embodiments, the sintered metal layer may include a composition including oxides as glass, and may include, for example, one or more selected from the group consisting of silicon oxides, boron oxides, aluminum oxides, transition metal oxides, alkali metal oxides, and alkaline earth metal oxides. The transition metal may include at least one selected from the group consisting of zinc (Zn), titanium (Ti), copper (Cu), vanadium (V), manganese (Mn), iron (Fe), and nickel (Ni), and the alkali metal may be selected from lithium (Li), sodium (Na), and potassium (K), and the alkaline earth metal may be one or more selected from magnesium (Mg), calcium (Ca), strontium (Sr), and barium (Ba).

Optionally, the conductive resin layer is formed on the sintered metal layer, and for example, may be formed to completely cover the sintered metal layer. Meanwhile, the first external electrode 131 and the second external electrode 132 may not include a sintered metal layer, and in this case, the conductive resin layer may be in direct contact with the capacitor body 110.

The conductive resin layers may extend to the first and second surfaces or fifth and sixth surfaces of the capacitor body 110, and the lengths of regions (i.e., band portions) where the conductive resin layers extend to the first and second surfaces or fifth and sixth surfaces of the capacitor body 110 may be longer than the lengths of regions (i.e., band portions) where the sintered metal layers extend in the first and second surfaces or fifth and sixth surfaces of the capacitor body 110. In other words, the conductive resin layers may be formed on the sintered metal layers, and may be formed so as to completely cover the sintered metal layers.

The conductive resin layers may include a resin and a conductive metal.

The resin which is included in the conductive resin layers is not particularly limited as long as it has a bonding property and an impact absorption property and can be mixed with conductive metal powder to form a paste, and may include, for example, a phenolic resin, an acrylic resin, a silicon resin, an epoxy resin, or a polyimide resin.

The conductive metal that is included in the conductive resin layers may serve to electrically connect the conductive resin layers to the first internal electrode 121 and the second internal electrode 122, or the sintered metal layer.

The conductive metal that is included in the conductive resin layer may have a spherical shape, a flake shape, or a combination thereof. In other words, the conductive metal may be formed only in a flake shape, or may be formed only in a spherical shape, or may be the form of a mixture of a flake shape and a spherical shape.

Herein, the spherical shape may include a shape which is not completely spherical, and may include, for example, a shape in which a ratio of the length of the major axis to the length of the minor axis (major axis/minor axis) may be less than or equal to about 1.45. The flake-type powder refers to a powder with a flat and elongated shape, and is not particularly limited, but for example, a ratio of the length of the major axis to the length of the minor axis (major axis/minor axis) may be greater than or equal to about 1.95.

The first external electrode 131 and the second external electrode 132 may further include a plating layer disposed outside the conductive resin layer.

The plating layer may include at least one selected from the group consisting of nickel (Ni), copper (Cu), tin (Sn), palladium (Pd), platinum (Pt), gold (Au), silver (Ag), tungsten (W), titanium (Ti), or lead (Pb), which may be included alone or alloys thereof. According to some embodiments, each plating layer may include a nickel (Ni) plating layer or a tin (Sn) plating layer, or may be a form in which a nickel (Ni) plating layer and a tin (Sn) plating layer are sequentially stacked, or may be a form in which a tin (Sn) plating layer, a nickel (Ni) plating layer, and a tin (Sn) plating layer are sequentially stacked. Alternatively, each plating layer may include a plurality of nickel (Ni) plating layers and/or a plurality of tin (Sn) plating layers.

The plating layer can improve mountability to the substrate, structural reliability, durability to the outside, heat resistance, and equivalent series resistance (ESR) of the multilayered capacitor 100.

Method of Manufacturing Multilayered Capacitor

A method of manufacturing the multilayered capacitor according to another embodiments includes manufacturing a capacitor body including a dielectric layer and an internal electrode and then, forming an external electrode on the outside of the capacitor body.

First, the manufacturing the capacitor body is illustrated.

In the manufacturing process of the capacitor body, a dielectric paste, which would be formed into a dielectric layer after sintering, and a conductive paste, which would be formed into an internal electrode after the sintering, are prepared.

The dielectric paste is, for example, prepared in the following method. Dielectric powders are uniformly mixed through wet mixing and the like, dried, and heat-treated under predetermined conditions obtain plasticized powder. Subsequently, an organic vehicle or an aqueous vehicle is added to the plasticized powder and additionally, kneaded to prepare the dielectric paste.

The obtained dielectric paste may be formed into a dielectric green sheet by using a technique such as the doctor blade method. Additionally, the dielectric paste may include additives selected from various dispersants, plasticizers, dielectrics, subcomponent compounds, or glass, if necessary.

The conductive paste for internal electrodes mat be prepared by kneading a compound represented by Chemical Formula 1 and a conductive metal serving as a sacrificial metal with a binder or solvent.

$$M_{n+1}AX_n \qquad \text{[Chemical Formula 1]}$$

In Chemical Formula 1,

M includes at least one selected from the group consisting of Ti, Zr, Hf, Sc, Cr, V, Nb, Ta, Mo, Mn, and combinations thereof, A includes at least one selected from the group consisting of Al, Ga, In, Tl, Si, Ge, Sn, Pb, Zn, Cd, P, As, S, Cu, Au, and combinations thereof, X includes C, N, or combinations thereof, and n is an integer of 1 to 4.

The compound represented by Chemical Formula 1 and the conductive metal serving as a sacrificial metal are the same as previously described, of which detailed description will be omitted.

The compound represented by Chemical Formula 1 may be included in an amount of about 1 wt % to about 10 wt % based on a total amount of the conductive paste for an internal electrode.

When the compound represented by Chemical Formula 1 is included in an amount of less than about 1 wt % based on the total amount of the conductive paste for an internal electrode, because it is difficult to form a metal oxide layer with a sufficient thickness, the Max phase compound included in an internal electrode may be decomposed. In addition, if the compound represented by Chemical Formula 1 is included in an amount of about 10 wt % based on the total amount of the conductive paste for an internal electrode, it may be difficult to sufficiently improve electrode connectivity.

The conductive paste for an internal electrode is coated with a predetermined pattern on the dielectric green sheet surface in various printing methods such as screen printing or transfer methods, etc. Subsequently, the dielectric green sheets with the internal electrode pattern in plural are stacked and then, pressed in a stacking direction to obtain a dielectric green sheet laminate. Herein, the internal electrode patterns may be stacked so that the dielectric green sheet laminate may have a dielectric green sheet at the top and at the bottom in the stacking direction.

Optionally, the obtained dielectric green sheet laminate may be cut into a predetermined size by dicing or the like.

In addition, the dielectric green sheet laminate, if necessary, may be solidified and dried to remove the plasticizer and the like and then, barrel-polished by using a horizontal centrifugal barrel machine, etc. In the barrel-polishing, unnecessary parts such as burrs, etc., which are generated during the cutting, may be polished by inserting the dielectric green sheet laminate with media and a polishing solution into a barrel container and then, applying rotational motion, vibration, or the like to the barrel container. In addition, after the barrel-polishing, the dielectric green sheet laminate may be washed with a cleaning solution such as water and the like and dried.

The dielectric green sheet laminate is subjected to binder removal and sintering treatments to obtain a capacitor body.

The binder removal treatment is performed under conditions appropriately adjusted according to a main component composition of the dielectric layer and a main component composition of the internal electrode. For example, the binder removal treatment may be performed by increasing a temperature at about 5° C./hour to about 300° C./hour and maintained at a support temperature of about 180° C. to about 400° C. for about 0.5 hour to about 24 hours. The binder removal may be performed under an air or reducing atmosphere.

The sintering treatment may be performed under conditions appropriately adjusted according to a main component composition of the dielectric layer or a main component composition of the internal electrode. For example, the sintering treatment may be performed at about 1200° C. to about 1350° C. or about 1220° C. to about 1300° C. for about 0.5 hour to about 8 hours or about 1 hour to about 3 hours. The sintering treatment may be performed under a reducing atmosphere, for example, under an atmosphere in which a mixed gas of nitrogen gas ($N_2$) and hydrogen gas ($H_2$) is humidified.

After the sintering treatment, annealing may be performed. Because the annealing is a treatment to reoxidize the dielectric layer, if the sintering is performed under the reducing atmosphere, the annealing may be performed. The annealing treatment is performed under conditions appropriately adjusted according to a main component composition of the dielectric layer and the like. For example, the annealing treatment may be performed at about 950° C. to about 1150° C. for about 0 hour to about 20 hours at about 50° C./hour to about 500° C./hour. In addition, the annealing may be performed under a humidified nitrogen gas ($N_2$) atmosphere at an oxygen partial pressure of about $1.0\times10^{-9}$ MPa to about $1.0\times10^{-5}$ MPa.

The humidifying nitrogen gas, mixed gas, or the like in the binder removal treatment, the sintering treatment, or the annealing treatment may be performed, for example, by using a wetter and the like, wherein a temperature of water used therein may be at about 5° C. to about 75° C. The binder removal treatment, the sintering treatment, and the annealing treatment may be performed sequentially or independently.

Optionally, the third and fourth surfaces of the capacitor body may be subjected to surface treatment such as sand blasting, laser irradiation, or barrel polishing. This surface treatment may expose ends of the first and second internal electrodes onto the outermost surfaces of the third and fourth surfaces, which may solidify electrical bonding between the first and second external electrodes and the first and second internal electrodes and easily forming alloy portions.

Subsequently, a paste for forming a sintered metal layer is coated on the outside of the obtained capacitor body and sintered to form sintered metal layers as the external electrodes.

The paste for forming a sintered metal layer may include a conductive metal and glass. The conductive metal and the glass are the same as aforementioned above and thus will not be repetitively mentioned. In addition, the paste for forming a sintered metal layer may optionally include a subcomponent such as a binder, solvent, dispersant, plasticizer, or oxide powder. For example, the binder may be ethylcellulose, acrylic, or butyral, and the solvent may be an organic solvent such as terpineol, butyl carbitol, alcohol, methyl ethyl ketone, acetone, or toluene, or an aqueous solvent.

A method of coating the paste for forming a sintered metal layer on the outside of the capacitor body may include various printings such as dipping, or screen printing and the like, coating by using a dispenser, etc., spraying using a spray, and the like. The paste for forming a sintered metal layer is coated at least on the third and fourth surfaces of the capacitor body and optionally, each portion of the first surface, the second surface, the fifth surface, or the sixth surface where band portions of the first and second external electrodes are formed.

Subsequently, the capacitor body, which is coated with the paste for forming a sintered metal layer, is dried and sintered at about 700° C. to about 1000° C. for about 0.1 hour to about 3 hours to form the sintered metal layers.

Optionally, on the outside of the obtained capacitor body, a paste for forming a conductive resin layer is coated and cured to form a conductive resin layer.

The paste for forming the conductive resin layer may include a resin and, optionally, a conductive metal or a non-conductive filler. Because the descriptions of the conductive metal and resin are the same as described above, repetitive description will be omitted. Additionally, the paste for forming the conductive resin layer may optionally include a subcomponent such as a binder, solvent, dispersant, plasticizer, or oxide powder. For example, the binder may include ethylcellulose, acrylic, or butyral, and the solvent may include an organic solvent such as terpineol, butyl carbitol, alcohol, methyl ethyl ketone, acetone, or toluene, or an aqueous solvent.

For example, a method of forming the conductive resin layer may include dipping the capacitor body 110 in the paste for forming a conductive resin layer and curing it, or printing the paste for forming a conductive resin layer on the surface of the capacitor body 110 in screen printing, gravure printing, etc. or coating and coating the paste for forming a conductive resin layer on the surface of the capacitor body 110 and then, curing it.

Subsequently, the plating layer is formed on the outside of the conductive resin layer.

For example, the plating layer may be formed in a plating method, for example, by sputtering or electric deposition.

Hereinafter, specific examples of the invention will be presented. However, the following examples are intended only to specifically illustrate or describe the invention, and should not be construed as limiting the scope of the invention.

Preparation Example: Preparation of Conductive Paste for Internal Electrode

A conductive paste for internal electrodes including $Ti_3AlC_2$ and Ni, a sacrificial metal, was prepared. Specifically, after weighing the materials so that Ni may be included in an amount of about 4.6 wt % based on the total amount of the conductive paste for an internal electrode, $Ti_3AlC_2$ and Ni were Ram-mixed to prepare the conductive paste for an internal electrode.

Example: Manufacturing of Multilayered Capacitor

Example 1

A dielectric green sheet was prepared by preparing dielectric slurry including $BaTiO_3$ and then, coating the dielectric slurry with a head discharge-type on-roll coater.

The conductive paste for internal electrode prepared in Preparation Example was printed on the surface of the dielectric green sheet, and the dielectric green sheets (width×length×height=3.2 mm×2.5 mm×2.5 mm) with the conductive paste layer are in plural stacked and compressed to manufacture a dielectric green sheet laminate.

The dielectric green sheet laminate was plasticized at 400° C. or less under a nitrogen atmosphere and sintered at 1300° C. or less at a hydrogen ($H_2$) concentration of 1.0% or less to manufacture a multilayered capacitor according to Example 1.

Comparative Example 1

A multilayered capacitor according to Comparative Example 1 was manufactured in the same manner as in Example 1 except that the conductive paste for internal electrode was prepared by including Ni and a sintering aid ($BaTiO_3$).

Comparative Example 2

A multilayered capacitor according to Comparative Example 2 was manufactured in the same manner as in Example 1 except that the conductive paste for internal electrode was prepared by including $Ti_3AlC_2$ alone without Ni, a sacrificial metal.

EVALUATION EXAMPLES

Evaluation Example 1: Elemental Analysis of Conductive Paste for Internal Electrode FIG. 4 is (a) an SEM image showing the conductive paste for internal electrode according to the preparation example and for the SEM image, (b) a Ti-mapping image, (c) an Al-mapping image, (d) a C-mapping image, and (e) an Ni-mapping image.

Figure 4:
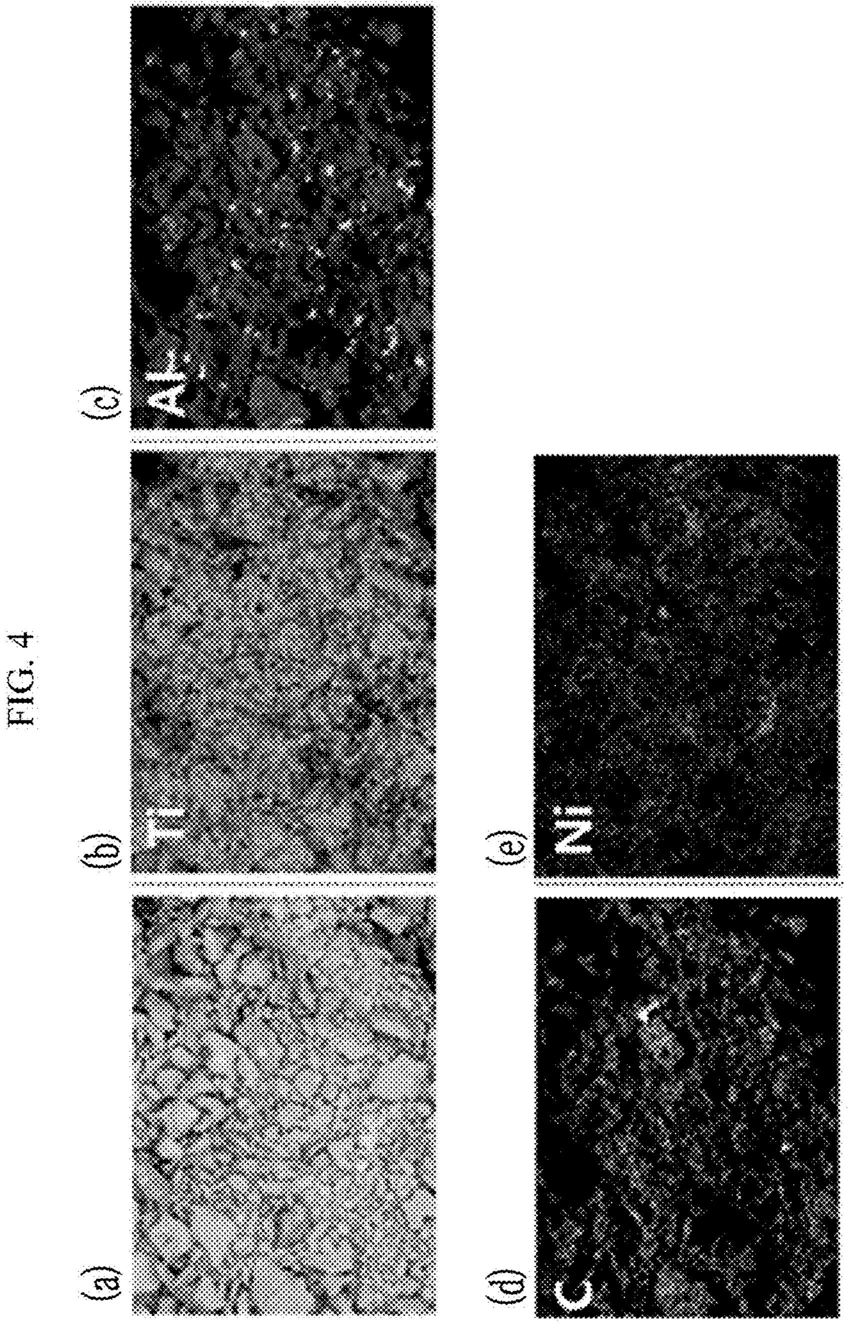
FIG. 4 is (a) an SEM image of a conductive paste for an internal electrode according to the preparation example, (b) a Ti-mapping image for the SEM image, (c) an Al-mapping image for the SEM image, (d) a C-mapping image for the SEM image, and (e) an Ni-mapping image for the SEM image.

Referring to FIG. 4, the conductive paste for an internal electrode according to the preparation example turns out to include constituent elements of $Ti_3AlC_2$ and Ni of a sacrificial metal. In addition, through the Ni mapping, as a result of measuring a content (wt %) of the conductive paste for internal electrode, 4.6 wt % of Ni was included in the conductive paste for an internal electrode according to the preparation example.

Evaluation Example 2: Micro XRD Evaluation

After curing each multilayered capacitor according to Example 1 and Comparative Example 1 by placing it in an epoxy mixture, the L-axis and T-axis direction sides of the capacitor body were polished to the ½ point in a W-axis direction, and then, cut in the L-axis direction and the T-axis direction from the center of the W-axis direction of the capacitor body to prepare each cross-sectional sample.

Figure 5:
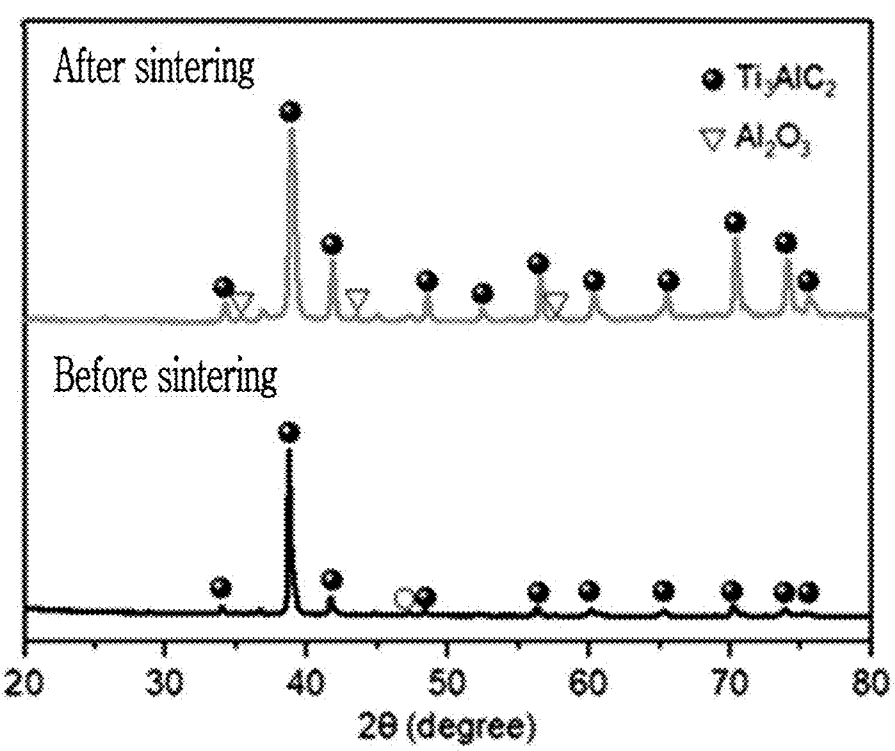
FIG. 5 shows XRD analysis results before and after sintering during manufacturing the multilayered capacitor of Example 1.
Figure 6:
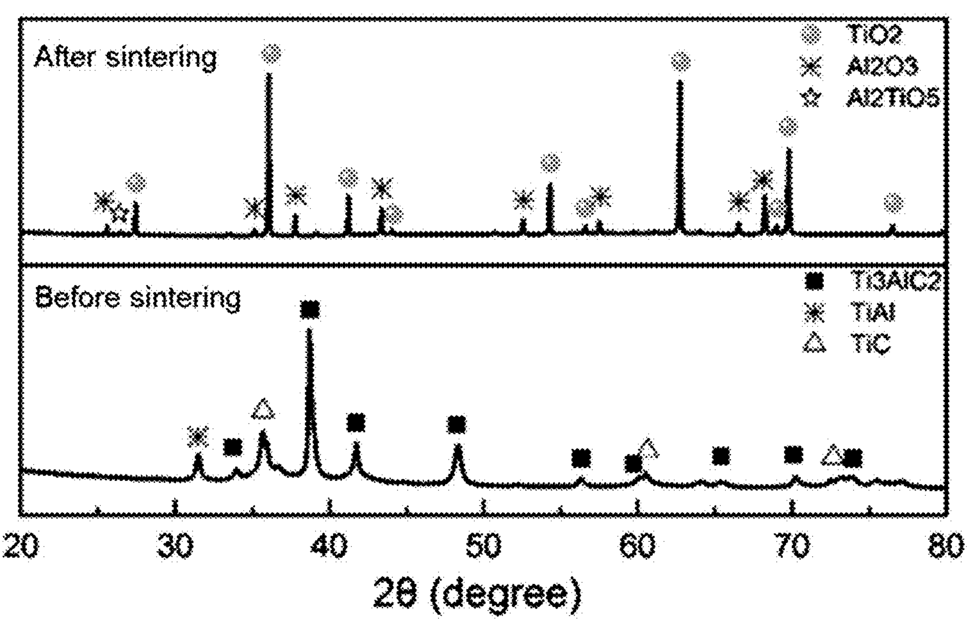
FIG. 6 shows XRD analysis results before and after the sintering during manufacturing a multilayered capacitor of Comparative Example 1.

The cross-sectional samples were Micro XRD-analyzed within a range including an internal electrode and an interface between the internal electrode and a dielectric layer, and the results are respectively shown in FIGS. 5 and 6. In addition, the cross-sectional samples of the multilayered capacitors of Example 1 and Comparative Example 1 before sintering the dielectric green sheet laminate were prepared and then, Micro XRD-analyzed, and the results are respectively shown in FIGS. 5 and 6.

FIG. 5 shows XRD analysis results before and after the sintering in manufacturing the multilayered capacitor of Example 1. FIG. 6 shows XRD analysis results before and after the sintering in manufacturing the multilayered capacitor of Comparative Example 1.

Referring to FIG. 5, in Example 1, a peak of $Ti_3AlC_2$ is mainly confirmed before the sintering, but after the sintering, because an Ni oxide layer is formed and may prevent oxidation of Al, a weak peak of $Al_2O_3$ is confirmed.

Referring to FIG. 6, in Comparative Example 1, unlike Example 1, after the sintering, Al, which has a relatively weak bond in $Ti_3AlC_2$, is first oxidized and forms an $Al_2O_3$ layer, and then, Ti is oxidized and forms a $TiO_2$ layer on the $Al_2O_3$ layer, which conform main peaks of $Al_2O_3$ and $TiO_2$.

Evaluation Example 3: SEM Image Analysis

Figure 7:
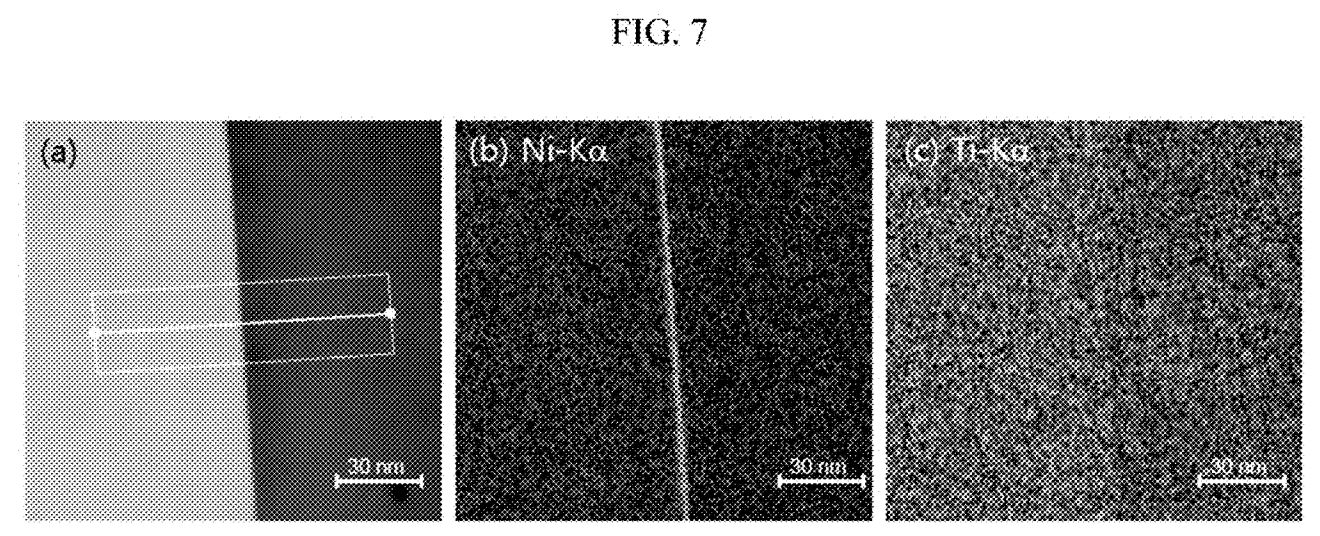

FIG. 7 is (a) a scanning electron microscope (SEM) image of the cross-section of the multilayered capacitor according to Example 1, (b) an SEM-EDS analysis image by Ni mapping for (a) the SEM image, and (c) an SEM-EDS analysis image by Ti mapping for (a) the SEM image.

Figure 8:
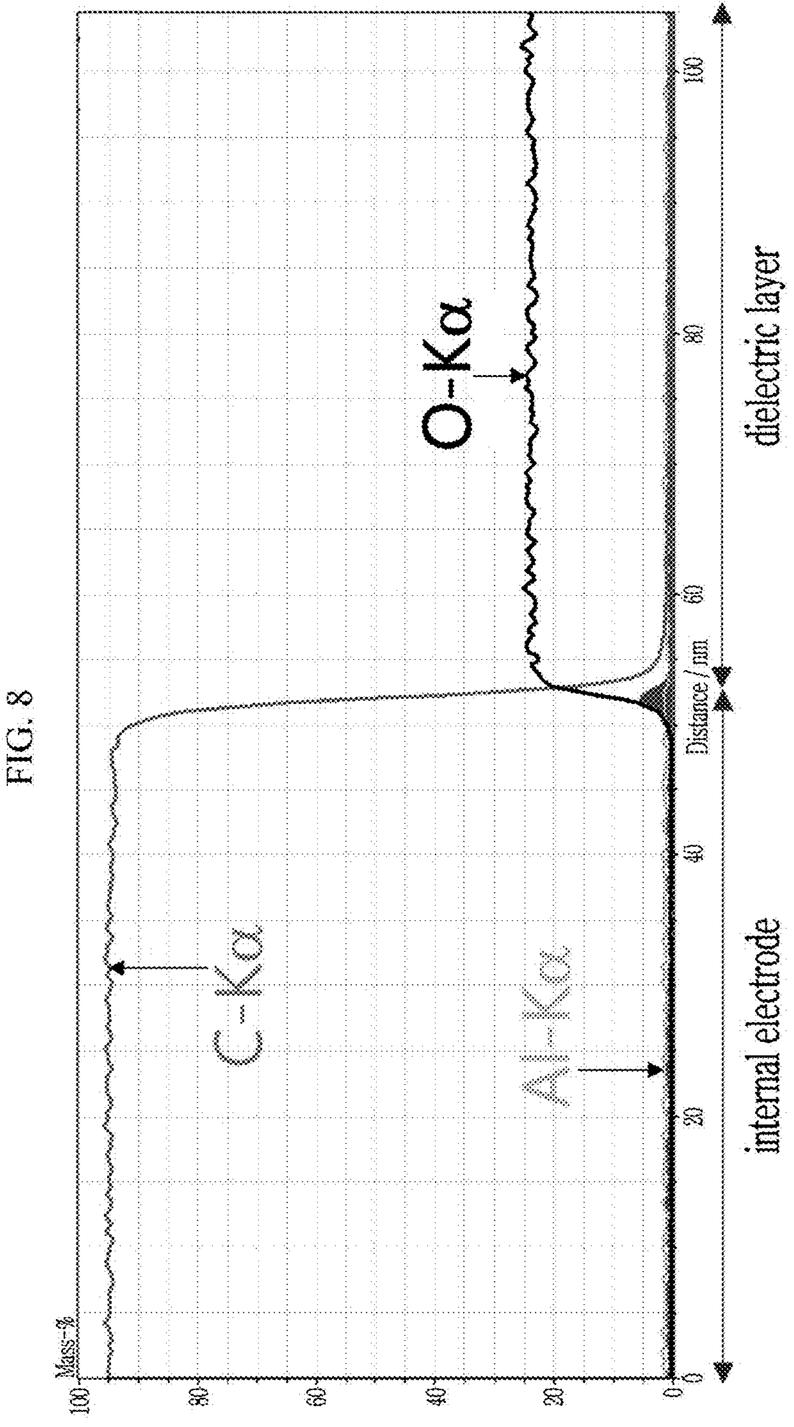
FIG. 8 is a graph showing line profile analysis results of Al, C, and O elements depending on position changes of internal electrodes and dielectric layer of the multilayered capacitor according to Example 1.
Figure 9:
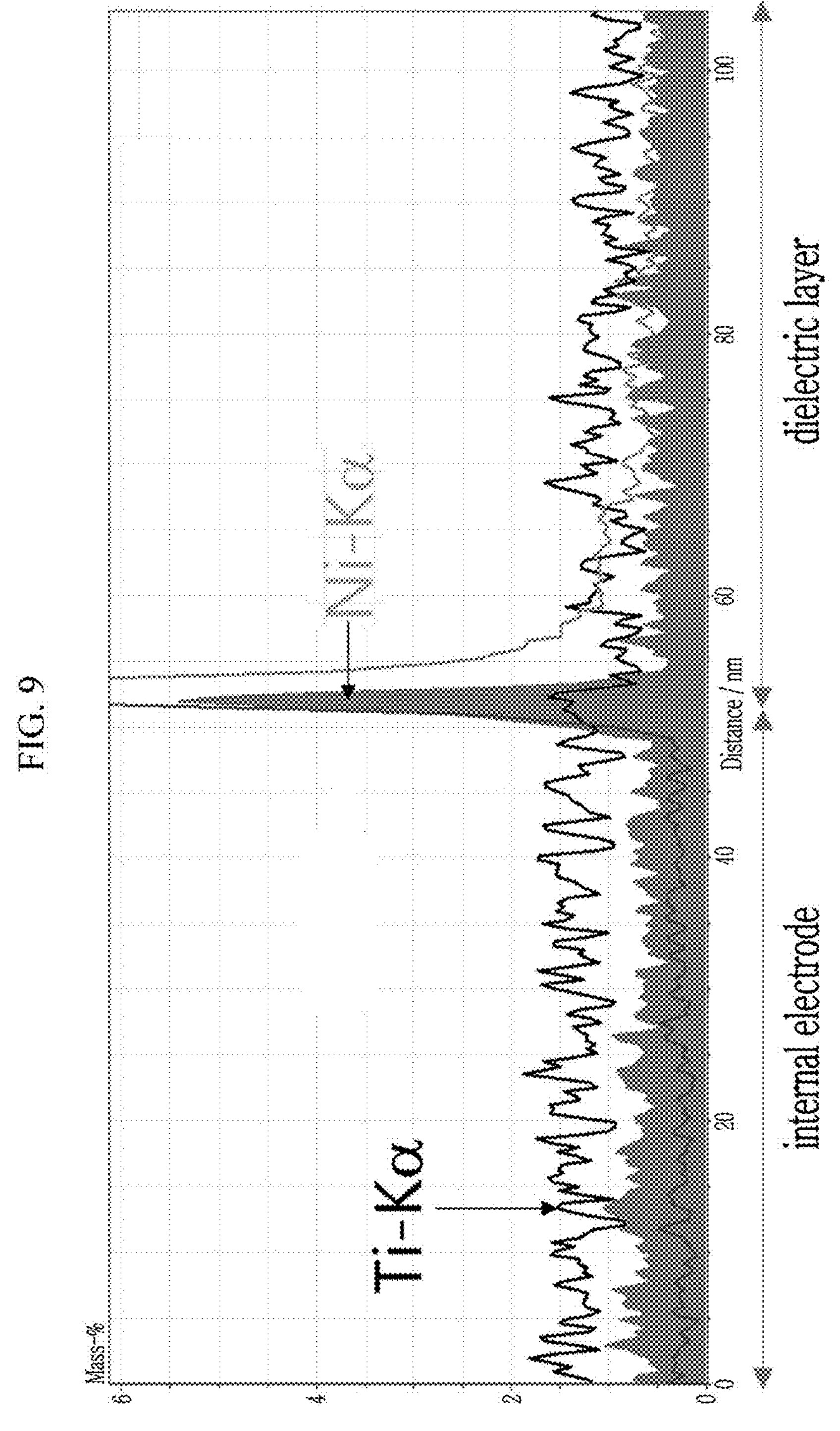
FIG. 9 is a graph showing line profile analysis results of Ti and Ni elements depending on position changes of the internal electrodes and the dielectric layer of the multilayered capacitor according to Example 1.

FIG. 8 is a graph showing line profile analysis results for Al, C, and O elements according to position changes of the internal electrodes and the dielectric layer of the multilayered capacitor according to Example 1. FIG. 9 is a graph showing line profile analysis results for Ti and Ni elements according to position changes of the internal electrodes and the dielectric layer of the multilayered capacitor according to Example 1. In FIGS. 8 and 9, the line profile analysis was performed in a region marked in (a) of FIG. 7.

Referring to FIG. 7, in the multilayered capacitor according to Example 1, a metal oxide layer including Ni was formed between the internal electrode and the dielectric layer.

Referring to FIG. 8, in the multilayered capacitor according to Example 1, Al and C elements included in $Ti_3AlC_2$, which is a Max phase compound, were confirmed in the internal electrodes, and in the dielectric layer, an O element included in $BaTiO_3$ was confirmed.

Referring to FIG. 9, in the multilayered capacitor according to Example 1, a layer including Ni was present between the internal electrode and the dielectric layer.

While this invention has been described in connection with what is presently considered to be practical example embodiments, it is to be understood that the invention is not limited to the disclosed example embodiments. On the contrary, it is intended to cover various modifications and equivalent arrangements included within the spirit and scope of the appended claims.

DESCRIPTION OF SYMBOLS

100: multilayered capacitor
110: capacitor body
111: dielectric layer
112, 113: cover region
121: first internal electrode
122: second internal electrode
131: first external electrode
132: second external electrode

What is claimed is:

1. A multilayered capacitor, comprising a capacitor body including a dielectric layer; an internal electrode; and a metal oxide layer between the dielectric layer and the internal electrode, and an external electrode disposed an outside surface of the capacitor body, wherein the internal electrode includes a compound represented by Chemical Formula 1:

$$M_{n+1}AX_n \quad \text{[Chemical Formula 1]}$$

wherein in Chemical Formula 1,

M includes at least one selected from the group consisting of Ti, Zr, Hf, Sc, Cr, V, Nb, Ta, Mo, Mn, and combinations thereof, A includes at least one selected from the group consisting of Al, Ga, In, Tl, Si, Ge, Sn, Pb, Zn, Cd, P, As, S, Cu, Au, and combinations thereof, X includes C, N, or a combination thereof, and n is an integer of 1 to 4.

2. The multilayered capacitor of claim 1, wherein the compound represented by Chemical Formula 1 includes at least one selected from the group consisting of $Ti_2AlC$, $V_2AlC$, $Cr_2AlC$, $Nb_2AlC$, $Ta_2AlC$, $Zr_2AlC$, $Ti_2AlN$, $Ti_3AlC_2$, $V_3AlC_2$, $Ta_3AlC_2$, $Zr_3AlC_2$, $Ti_4AlN_3$, $V_4AlC_3$, $Nb_4AlC_3$, $Ta_4AlC_3$, (Mo, V)$_4AlC_3$, $Mo_4VAlC_4$, $Ti_3SiC_2$, $Ti_4SiC_3$, $Ti_2CdC$, $Sc_2InC$, $Sc_2SnC$, $Ti_2GaC$, $Ti_2InC$, $Ti_2TlC$, $V_2GaC$, $Cr_2GaC$, $Ti_2GaN$, $Ti_2InN$, $V_2GaN$, $Cr_2GaN$, $Ti_2GeC$, $Ti_2SnC$, $Ti_2PbC$, $V_2GeC$, $Cr_2GeC$, $V_2PC$, $V_2AsC$, $Ti_2SC$, ZraInC, $Zr_2TlC$, $Nb_2GaC$, $Nb_2InC$, $Mo_2GaC$, $Zr_2InN$, $Zr_2TlN$, $Zr_2SnC$, $Zr_2PbC$, $Nb_2SnC$, $Nb_2PC$, $Nb_2AsC$, $Zr_2SC$, $Nb_2SC$, $Hf_2InC$, $Hf_2TlC$, $Ta_2GaC$, $Hf_2SnC$, $Hf_2PbC$, $Hf_2SnN$, $Hf_2SC$, $Ti_2ZnC$, $Ti_2ZnN$, $V_2ZnC$, $Nb_2CuC$, $Mn_2GaC$, $Mo_2AuC$, $Ti_2AuN$, $Ti_3GaC_2$, $Ti_3InC_2$, $Ti_3GeC_2$, $Ti_2SnC_2$, $Ti_3ZnC_2$, $Ti_4GaC_3$, $Ti_4GeC_3$, and combinations thereof.

3. The multilayered capacitor of claim 1, wherein the compound represented by Chemical Formula 1 includes a compound represented by Chemical Formula 1A:

$$M_{n+1}A^{1}X_{n} \quad \text{[Chemical Formula 1A]}$$

wherein in Chemical Formula 1A,

M includes at least one selected from the group consisting of Ti, Zr, Cr, V, Nb, Ta, Mo, Hf, Sc, Mn, and combinations thereof, $A^1$ includes Al or Si, X includes C, N, or a combination thereof, and n is an integer of 1 to 4.

4. The multilayered capacitor of claim 3, wherein the compound represented by Chemical Formula 1A includes at least one selected from the group consisting of $Ti_2AlC$, $V_2AlC$, $Cr_2AlC$, $Nb_2AlC$, $Ta_2AlC$, $Zr_2AlC$, $Ti_2AlN$, $Ti_3AlC_2$, $V_3AlC_2$, $Ta_3AlC_2$, $Zr_3AlC_2$, $Ti_4AlN_3$, $V_4AlC_3$, $Nb_4AlC_3$, $Ta_4AlC_3$, (Mo, V)$_4AlC_3$, $Mo_4VAlC_4$, $Ti_3SiC_2$, $Ti_4SiC_3$, and combinations thereof.

5. The multilayered capacitor of claim 1, wherein the compound represented by Chemical Formula 1 includes a compound represented by Chemical Formula 1B:

$$M_{n+1}AlC_{n} \quad \text{[Chemical Formula 1B]}$$

wherein in Chemical Formula 1B,

M includes Ti, Zr, Cr, V, Nb, Ta, Mo, Hf, Sc, Mn, or a combination thereof, and n is an integer of 1 to 4.

6. The multilayered capacitor of claim 5, wherein the compound represented by Chemical Formula 1B includes $Ti_2AlC$, $V_2AlC$, $Cr_2AlC$, $Nb_2AlC$, $Ta_2AlC$, $Zr_2AlC$, or a combination thereof.

7. The multilayered capacitor of claim 1, wherein the internal electrode further includes a conductive metal, and the conductive metal includes at least one selected from the group consisting of Ni, Mg, Al, Zr, Bi, Ru, Ir, Cu, Co, Zn, Ag, Pd, Au, Co, Mn, Cr, Pt, Sn, W, Ti, Pb, an alloy thereof, and combinations thereof.

8. The multilayered capacitor of claim 1, wherein the metal oxide layer includes at least one selected from the group consisting of Ni oxide, Mg oxide, Al oxide, Zr oxide, Bi oxide, Ru oxide, Ir oxide, Cu oxide, Co oxide, Zn oxide, Ag oxide, Pd oxide, Au oxide, Co oxide, Mn oxide, Cr oxide, Pt oxide, Sn oxide, W oxide, Ti oxide, Pb oxide, and combinations thereof.

9. The multilayered capacitor of claim 1, wherein the dielectric layer includes a barium titanite-based compound as a main component, and the barium titanite-based compound includes at least one selected from the group consisting of $Ba_mTiO_3$ ($0.995 \le m \le 1.010$), $(Ba_{1-x}Ca_x)_m(Ti_{1-y}Zr_y)O_3$ ($0.995 \le m \le 1.010$, $0 \le x \le 0.10$, $0 < y \le 0.20$), $Ba_m(Ti_{1-x}Zr_x)O_3$ ($0.995 \le m \le 1.010$, $x \le 0.10$), $(Ba_{1-x}Ca_x)_m(Ti_{1-y}Sn_y)O_3$ ($0.995 \le m \le 1.010$, $0 \le x \le 0.10$, $0 < y \le 0.20$), and combinations thereof.

10. A multilayered capacitor, comprising a capacitor body including a dielectric layer; an internal electrode including a conductive metal; and a metal oxide layer between the dielectric layer and the internal electrode, and an external electrode disposed an outside surface of the capacitor body, wherein the internal electrode includes a compound represented by Chemical Formula 1:

$$M_{n+1}AX_{n} \quad \text{[Chemical Formula 1]}$$

wherein in Chemical Formula 1,

M includes at least one selected from the group consisting of Ti, Zr, Hf, Sc, Cr, V, Nb, Ta, Mo, Mn, and combinations thereof, A includes at least one selected from the group consisting of Al, Ga, In, Tl, Si, Ge, Sn, Pb, Zn, Cd, P, As, S, Cu, Au, and combinations thereof, X includes C, N, or a combination thereof, and n is an integer of 1 to 4.

11. The multilayered capacitor of claim 10, wherein the compound represented by Chemical Formula 1 includes at least one selected from the group consisting of $Ti_2AlC$, $V_2AlC$, $Cr_2AlC$, $Nb_2AlC$, $Ta_2AlC$, $Zr_2AlC$, $Ti_2AlN$, $Ti_3AlC_2$, $V_3AlC_2$, $Ta_3AlC_2$, $Zr_3AlC_2$, $Ti_4AlN_3$, $V_4AlC_3$, $Nb_4AlC_3$, $Ta_4AlC_3$, (Mo, V)$_4AlC_3$, $Mo_4VAlC_4$, $Ti_3SiC_2$, $Ti_4SiC_3$, $Ti_2CdC$, $Sc_2InC$, $Sc_2SnC$, $Ti_2GaC$, $Ti_2InC$, $Ti_2TlC$, $V_2GaC$, $Cr_2GaC$, $Ti_2GaN$, $Ti_2InN$, $V_2GaN$, $Cr_2GaN$, $Ti_2GeC$, $Ti_2SnC$, $Ti_2PbC$, $V_2GeC$, $Cr_2GeC$, $V_2PC$, $V_2AsC$, $Ti_2SC$, ZraInC, $Zr_2TlC$, $Nb_2GaC$, $Nb_2InC$, $Mo_2GaC$, $Zr_2InN$, $Zr_2TlN$, $Zr_2SnC$, $Zr_2PbC$, $Nb_2SnC$, $Nb_2PC$, $Nb_2AsC$, $Zr_2SC$, $Nb_2SC$, $Hf_2InC$, $Hf_2TlC$, $Ta_2GaC$, $Hf_2SnC$, $Hf_2PbC$, $Hf_2SnN$, $Hf_2SC$, $Ti_2ZnC$, $Ti_2ZnN$, $V_2ZnC$, $Nb_2CuC$, $Mn_2GaC$, $Mo_2AuC$, $Ti_2AuN$, $Ti_3GaC_2$, $Ti_3InC_2$, $Ti_3GeC_2$, $Ti_2SnC_2$, $Ti_3ZnC_2$, $Ti_4GaC_3$, $Ti_4GeC_3$, and combinations thereof.

12. The multilayered capacitor of claim 10, wherein the compound represented by Chemical Formula 1 includes a compound represented by Chemical Formula 1A:

$$M_{n+1}A^{1}X_{n} \quad \text{[Chemical Formula 1A]}$$

wherein in Chemical Formula 1A,

M includes at least one selected from the group consisting of Ti, Zr, Cr, V, Nb, Ta, Mo, Hf, Sc, Mn, and combinations thereof, $A^1$ includes Al or Si, X includes C, N, or a combination thereof, and n is an integer of 1 to 4.

13. The multilayered capacitor of claim 12, wherein the compound represented by Chemical Formula 1A includes at least one selected from the group consisting of $Ti_2AlC$, $V_2AlC$, $Cr_2AlC$, $Nb_2AlC$, $Ta_2AlC$, $Zr_2AlC$, $Ti_2AlN$, $Ti_3AlC_2$, $V_3AlC_2$, $Ta_3AlC_2$, $Zr_3AlC_2$, $Ti_4AlN_3$, $V_4AlC_3$, $Nb_4AlC_3$, $Ta_4AlC_3$, $(Mo, V)_4AlC_3$, $Mo_4VAlC_4$, $Ti_3SiC_2$, $Ti_4SiC_3$, and combinations thereof.

14. The multilayered capacitor of claim 10, wherein the compound represented by Chemical Formula 1 includes a compound represented by Chemical Formula 1B:

$M_{n+1}AlC_n$ [Chemical Formula 1B]

wherein in Chemical Formula 1B,

M includes at least one selected from the group consisting of Ti, Zr, Cr, V, Nb, Ta, Mo, Hf, Sc, Mn, and combinations thereof, and n is an integer of 1 to 4.

15. The multilayered capacitor of claim 14, wherein the compound represented by Chemical Formula 1B includes at least one selected from the group consisting of $Ti_2AlC$, $V_2AlC$, $Cr_2AlC$, $Nb_2AlC$, $Ta_2AlC$, $Zr_2AlC$, and combinations thereof.

16. The multilayered capacitor of claim 10, wherein the conductive metal in the internal electrode includes at least one selected from the group consisting of Ni, Mg, Al, Zr, Bi, Ru, Ir, Cu, Co, Zn, Ag, Pd, Au, Co, Mn, Cr, Pt, Sn, W, Ti, Pb, an alloy thereof, and combinations thereof.

17. The multilayered capacitor of claim 10, wherein the metal oxide layer includes at least one selected from the group consisting of Ni oxide, Mg oxide, Al oxide, Zr oxide, Bi oxide, Ru oxide, Ir oxide, Cu oxide, Co oxide, Zn oxide, Ag oxide, Pd oxide, Au oxide, Co oxide, Mn oxide, Cr oxide, Pt oxide, Sn oxide, W oxide, Ti oxide, Pb oxide, and combinations thereof.

18. The multilayered capacitor of claim 10, wherein the dielectric layer includes a barium titanite-based compound as a main component, and the barium titanite-based compound includes at least one selected from the group consisting of $Ba_mTiO_3$ ($0.995 \le m \le 1.010$), $(Ba_{1-X}Ca_x)_m(Ti_{1-y}Zr_y)O_3$ ($0.995 \le m \le 1.010$, $0 \le x \le 0.10$, $0 < y \le 0.20$), $Ba_m(Ti_{1-x}Zr_x)O_3$ ($0.995 \le m \le 1.010$, $x \le 0.10$), $(Ba_{1-X}Ca_x)_m(Ti_{1-y}Sn_y)O_3$ ($0.995 \le m \le 1.010$, $0 \le x \le 0.10$, $0 < y \le 0.20$), and combinations thereof.

* * * * *